(12) United States Patent
Aue (10) Patent No.: US 8,345,734 B2
(45) Date of Patent: Jan. 1, 2013

(54) TIME ERROR ESTIMATION FOR DATA SYMBOLS

(75) Inventor: Volker Aue, Dresden (DE)

(73) Assignee: Entropic Communications, Inc., San Diego, CA (US)

( * ) Notice: Subject to any disclaimer, the term of this patent is extended or adjusted under 35 U.S.C. 154(b) by 455 days.

(21) Appl. No.: 12/377,976

(22) PCT Filed: Aug. 6, 2007

(86) PCT No.: PCT/IB2007/053093
§ 371 (c)(1),
(2), (4) Date: Feb. 18, 2009

(87) PCT Pub. No.: WO2008/020360
PCT Pub. Date: Feb. 21, 2008

(65) Prior Publication Data
US 2010/0166050 A1    Jul. 1, 2010

(30) Foreign Application Priority Data
Aug. 18, 2006  (EP) .................................... 06119179

(51) Int. Cl.
*H04B 17/00*    (2006.01)
(52) U.S. Cl. ........ 375/224; 375/260; 375/259; 375/354; 375/356; 375/316; 375/348
(58) Field of Classification Search ................. 375/260, 375/224, 259, 354, 356, 316, 348
See application file for complete search history.

(56) References Cited

U.S. PATENT DOCUMENTS

| 6,005,840 | A | * | 12/1999 | Awater et al. | 370/206 |
| 7,058,002 | B1 | * | 6/2006 | Kumagai et al. | 370/203 |
| 2004/0229581 | A1 | * | 11/2004 | Mizoguchi et al. | 455/136 |
| 2005/0276340 | A1 | | 12/2005 | Chow et al. | |
| 2005/0286649 | A1 | * | 12/2005 | Redfern | 375/260 |
| 2007/0217525 | A1 | * | 9/2007 | Vrcelj et al. | 375/260 |
| 2007/0237274 | A1 | * | 10/2007 | Nakache et al. | 375/355 |
| 2008/0025199 | A1 | * | 1/2008 | Yang et al. | 370/210 |

FOREIGN PATENT DOCUMENTS

| EP | 1071279 A1 | 1/2001 |
| EP | 1 122 745 A1 | 8/2001 |
| GB | 2345831 A | 7/2000 |

OTHER PUBLICATIONS

European Standard (Telecommunications Series; "ETSI EN 300 744 V1.4.1"; Jan. 2001; Digital Video Broadcasting (DVB); Framing Structure, Channel Coding and Modulation for Digital Terrestrial Television; Sophia Antipolis Cedex, France.

* cited by examiner

*Primary Examiner* — Siu Lee (57) ABSTRACT

The invention relates to a method and a system for estimating a symbol time error in a broadband transmission system, comprising: - determination a timing error signal of an input-signal of a discrete Fourier-transformation block (5) in a data symbol stream on the basis of intersymbol correlation using a predetermined period in each received symbol, - selecting as a predetermined period a number of samples of different useful data parts of a symbol, - determining the time error value ($\epsilon$) based on the intersymbol interference of the selected samples of the different parts of said symbol.

18 Claims, 7 Drawing Sheets

FIG. 10 a) late window
FIG. 11 b) very late window
FIG. 12 c) early window
FIG. 13 d) very early window

TIME ERROR ESTIMATION FOR DATA SYMBOLS

FIELD OF THE INVENTION

The invention relates to a method and a system for symbol time error estimation in a broadband transmission system.

BACKGROUND OF THE INVENTION

The invention is preferably used in data transmission systems employing orthogonal frequency division multiplexing (OFDM), in particular in wireless applications for digital video broadcasting (DVB, e.g. DVB-H, DVB-T), but can also be used for other transmission modes, such as ISDB-T, DAB, WiBro and WiMax. DVB, e.g. DVB-H and DVB-T are known standards for bringing digital television content for instance to mobile devices.

Such orthogonal frequency division multiplexing systems are very sensitive to the intersymbol interference (ISI), which is caused by the loss of orthogonality of the symbols. The invention relates to the compensation of the intersymbol interference by estimating a symbol time error.

The orthogonal frequency division multiplexing mode is a mode which converts a stream of symbols in a frame into parallel data of a block unit and then multiplexes the parallel symbols into different sub-carrier frequencies. The multi-carrier multiplex has the property that all carriers are orthogonal to one another with respect to a certain length that is typically $2^n$ such that a fast Fourier-transformation can be used. The OFDM mode is implemented with the discrete Fourier-transformation (DFT) at a receiver and the inverse discrete Fourier-transformation (IDFT) at a transmitter, which is simply obtained by the orthogonal property and the definition of the discrete Fourier-transformation.

In broadband transmission systems, a guard interval is formed by a cyclic extension preceding the output of the inverse discrete Fourier-transformation for each OFDM symbol.

DESCRIPTION OF EMBODIMENTS

Figure 1:
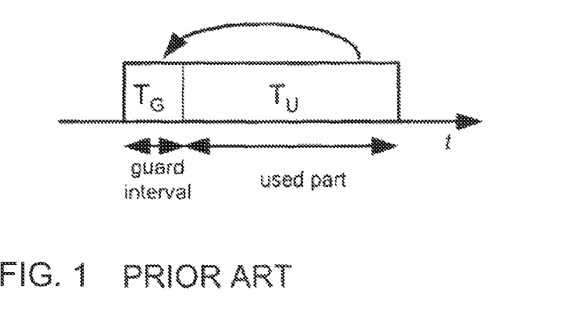
FIG. 1 shows the conventional structure of an OFDM symbol that is protected by a guard interval.
Figure 2:
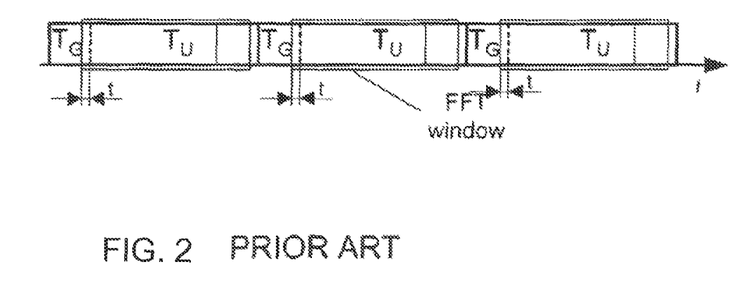
FIG. 2 illustrates that the receiver can select a window that is the size of the useful data part anywhere within this symbol when there is no multipath.

FIG. 1 shows the conventional structure of an OFDM symbol that is protected by a guard interval. The guard interval is formed by a cyclic prefix, i.e. a copy of the last samples of the so-called useful part is preceding the useful part. If there is no multipath, the receiver can select a window that is the size of the useful data part anywhere within this symbol as shown in FIG. 2.

The guard interval protects the useful data part from multipath distortion, and, if chosen sufficiently long, allows for single frequency networks (SFN). In an SFN, multiple transmitters transmit the same signal synchronously such that at a receiver those signals can be treated as multipath signals.

In multipath propagation environments, a transmitted signal reaches the receiver through multiple paths each of which may introduce a different delay, magnitude and phase thereby enlarging the transition time from one symbol to the next. If the transition time is smaller than the guard interval, the receiver can select a portion of the received symbol that is free from any interference introduced by adjacent symbols.

Identifying the useful part, i.e. the useful data part of an OFDM symbol that contains minimum interference from adjacent symbols (intersymbol interference), is a time synchronization task to be performed by the receiver. This task is critical to the overall receiver performance.

Time synchronization can be grouped into two main categories: acquisition and tracking. Symbol time acquisition defines the task of initially finding the correct timing. Often, the symbol time acquisition is divided into two or more steps, where in the first step, coarse time synchronization is achieved. In the following steps, the time window is refined. For those successive steps, similar or identical algorithms that are used for tracking are often applied. Tracking defines the task of constantly adjusting the time window in the course of continuous reception to keep the time window in its optimum location.

For OFDM, many efforts have been made for time tracking. The known methods can be grouped into data assisted and non-data assisted tracking, and pre-FFT or post-FFT based tracking. Data assisted tracking makes use of known symbols in OFDM, e.g. pilot symbols or preambles, where non-data assisted tracking makes use of the correlation properties of the signal.

In DVB-T which is aimed at continuous reception, the standard does not define any preambles. Pilot symbols are included in the multiplex, where the standard defines so-called scattered pilots at every $12^{th}$ carrier, and a smaller number of continual pilots that are present at fixed carrier locations.

Figure 3:
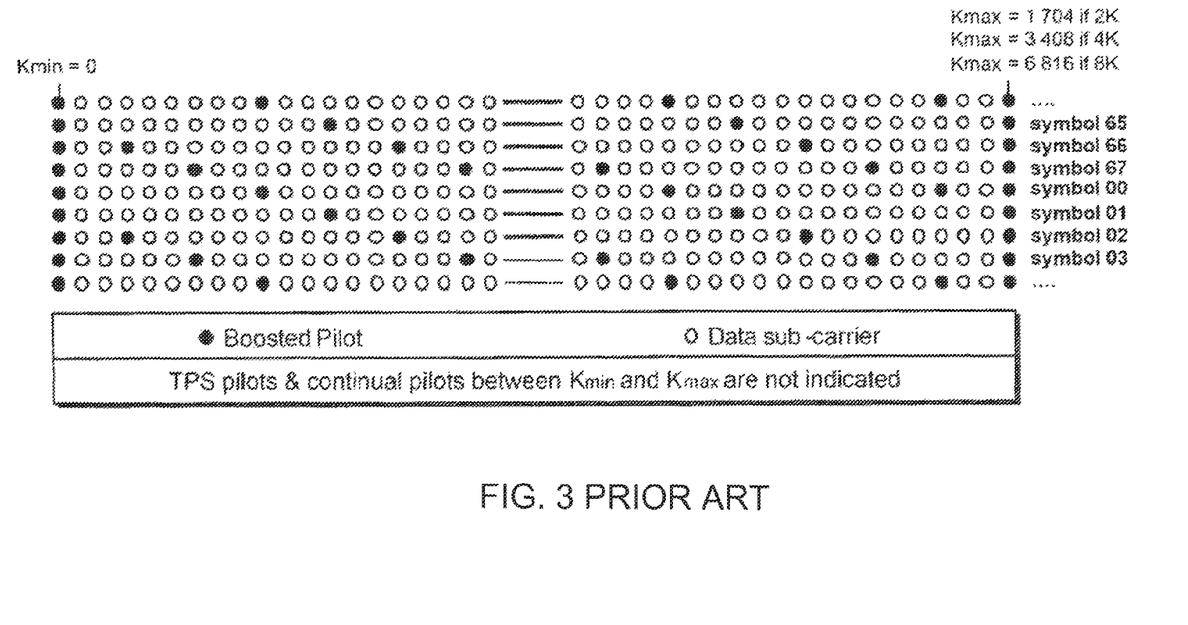
FIG. 3 shows the conventional insertion of the scattered pilots that are boosted in power.
(PRIOR ART)

The conventional insertion of the scattered pilots that are boosted in power as described in FIG. 11, on page 27 of European Telecommunication Standards Institute ETSI EN 300 744 V1.4.1 (2001-01), see FIG. 3—prior art.

Those pilot symbols are only accessible after the DFT and only after some coarse time synchronization has already been established. Therefore, most time synchronization algorithms for DVB-T/H use the auto-correlation properties of the OFDM symbols with its cyclic extension for coarse symbol time estimation, and then rely on the pilots for fine time synchronization and tracking.

In DVB-T the guard interval can be selected to be ¼, ⅛, 1/16, or 1/32 of the FFT (or DFT) size. In large scale single frequency networks (SFNs) even a guard interval of ¼ of the FFT size can almost be fully used by multipath. In some cases, it has been found that the delay spread even exceeds the guard interval. With pilots at every $12^{th}$ carrier, a channel impulse response of a time span of only 1/12 of the FFT length can be estimated which is clearly not sufficient for guard intervals equal or greater than 1/8. For reliable time synchronization for guard intervals equal to 1/8 of the FFT size or longer, it is therefore necessary to collect pilots from successive symbols in the same or similar fashion as it is done for estimating the channel transfer function that is needed for the frequency domain equalizer.

Two basic approaches for post-FFT based time synchronization are known both using an estimate of the channel transfer function: The first one calculates the average phase difference from one scattered pilot to the next thereby estimating the mean slopes of the channel transfer function. This is based on the property of the FFT that a delay in time, domain corresponds to a phase proportional to the carrier index and proportional to the delay in time domain. Therefore, in single paths channels, the time delay, which is denoted as in FIG. 2, can be directly estimated from the slope. Unfortunately, this technique does not perform satisfactorily under heavy multipath conditions. The more rigorous approach is to transfer the estimated channel transfer function back into time domain by means of an IFFT to obtain an estimate of the channel impulse response. Afterwards an energy search is performed on the estimated channel impulse response.

Another known approach is based on the continual pilots only.

A known alternative to post-FFT based time synchronization is to further improve the time domain correlation based method typically used for coarse time synchronization.

As discussed above, time tracking is crucial for the overall system performance. In DVB-T/H, the lack of preambles that could help accurately estimating the channel impulse response makes it difficult to find the optimum time window.

Some pre-FFT time domain based time tracking techniques that make use of the auto-correlation properties have been found to require relatively long averaging times to yield adequate results. Another disadvantage is that after the signal has been acquired those types of calculations are not required elsewhere in the receiver. Additionally, the performance under heavy multipath is not always optimum.

The post-FFT based methods introduced above also have disadvantages. As said above, the simple method using the estimate of the mean value of the slope of the channel transfer function, albeit giving satisfactory results in channels with low delay spread, has been found not to give adequate results under heavy multipath conditions as can be experienced in SFNs. Experiments have shown that this method does not withstand tests for guard interval utilization in single frequency networks.

The most robust technique up to now seems to be the IFFT based method, which calculates the channel impulse response from the estimated channel transfer function. This method, however, also is the most computational intensive method and requires additional memory. The problem that needs to be overcome when using this type of algorithm is the cyclic wrapping of the channel impulse response after 1/3 the FFT length that is due to the scattered pilot spacing at every third carrier when multiple symbols are collected. The cyclic wrapping may make it difficult to identify the beginning and end of the channel impulse response. Identifying the impulse response is also difficult in noisy environments, when the energy of the impulse response is spread over a large time interval.

DVB-H designed for mobile reception imposes additional challenges on the symbol time synchronization algorithms:
(1) In a mobile environment, the coherence time of the channel is lower, i.e. the channel is more time-varying.
(2) DVB-H makes use of time slicing. In time slicing, data are transmitted in bursts allowing the receiver to be switched off between bursts. This feature that allows the receiver to save a great deal of power consumption, however, also means that the channel cannot be tracked between bursts.

As a merit, the time tracking algorithms for DVB-H must be substantially faster than for DVB-T.

To illustrate those challenges, the following example of a two-path model as used in a test case is considered.

Figure 4:
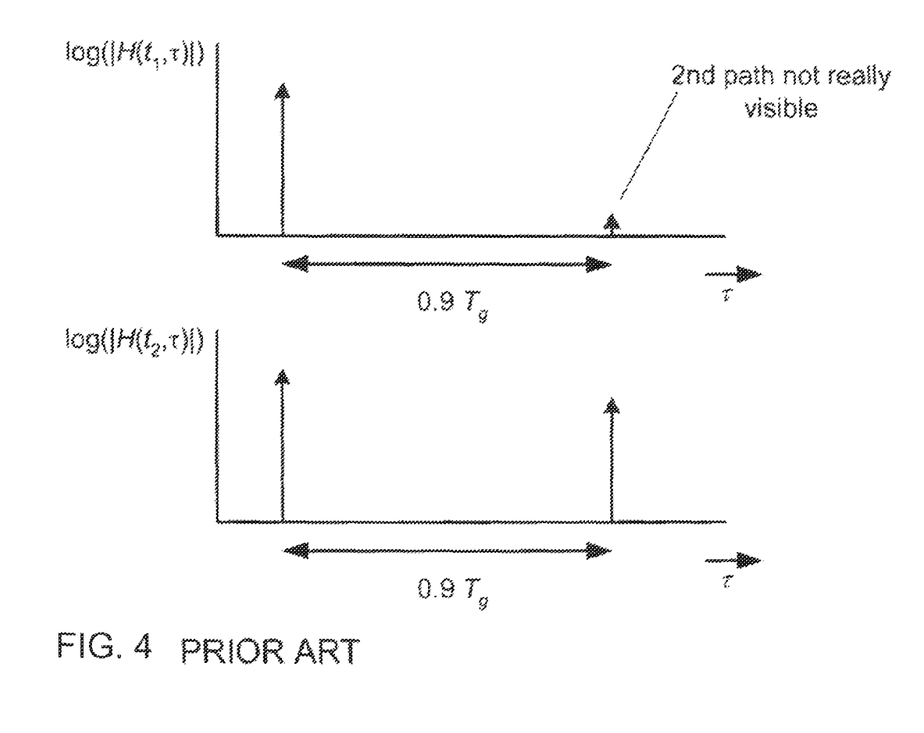
FIG. 4 shows the magnitude of the impulse responses of the conventional two path model at two timing instances.

FIG. 4 shows the magnitude of the impulse responses of the conventional two path model at two timing instances, t1 and t2, respectively. The two paths are separated by 0.9 times the guard interval duration Tg. At time instant t1, the second path is not really visible, as it is faded. In the real world, the first path may originate from one transmitter, and the second from another transmitter. Both transmitters synchronously transmit the same signal on the same frequency (SFN). At time instant t1, the second path is not visible as it can be blocked by an obstacle (shadow fading) or the path is actually a superposition of multiple paths that at time instance t1 add destructively (fast fading). A receiver locking to a received signal that experienced this channel at time instance t1, only sees the first path, and may just center this path to the middle of the guard interval. If the receiver is synchronizing to the signal to receive time-sliced bursts, it essentially has no history on the channel to rely on.

When after a relatively short time, e.g., a couple 10 ms the second path occurs, the receiver has to quickly readjust the symbol timing and place both paths into the guard interval such that no intersymbol interference occurs in the useful part.

Likewise, it is also possible that at time instance t1, the first path was subject to fading, and the receiver initially locked onto the second path.

This example shows that the symbol time tracking requirements for DVB-H are much more stringent than for continuous reception especially in stationary or quasi-stationary environments.

For DVB-T, it has often been argued that the computational load of the IFFT based method can be reduced, since the symbol time tracking can be done on a lower rate, and thus an IFFT does not have to be computed for every received symbol. In the context of mobile DVB-H, i.e. rapidly time varying channels and fast reacquisition times to reduce on-times and therefore power consumption, this assumption does not hold.

It is an object of this invention to specify a new method and a system for estimating a symbol time error for avoiding intersymbol interference.

According to the invention, the problem is solved by a method for estimating a symbol time error in a broadband transmission system comprising the attributes claimed herein.

Advantageous embodiments are given in the dependent claims.

The key aspect of the invention is the determination of a time error signal of an input-signal of a discrete Fourier-transformation block in the data symbol stream on the basis of intersymbol correlation using a predetermined period in each received symbol. A number of samples of an input signal for the DFT or FFT of a received symbol, e.g. of an actual symbol, a preceding symbol or a succeeding symbol, are selected as a predetermined period for different parts of said symbol, e.g. for the end and the middle part of said symbol. A time error value is determined on the base of the intersymbol interference of the selected samples of said different parts of said symbol in the time domain.

In more detail, in a receiver of the broadband transmission system a symbol time error estimator is established. The preferred symbol time error estimator comprises a unit for selecting a number of samples of different parts of a received symbol of an input signal of the discrete Fourier-transformation and a buffer for storing the selected samples of different parts of said symbol, e.g. of the actual symbol, the preceding symbol or the succeeding symbol. Furthermore, these selected samples of different parts of the relevant symbol are element-wise complex-conjugate multiplied with the buffered selected samples of the same different parts of said relevant symbol. For a first part of said relevant symbol, a first vector element-wise complex-conjugate multiplied with a corresponding vector from a time shifted vector are accumulated to a first averaged sum signals. For a second part of said relevant symbol, a second vector element-wise complex-conjugate multiplied with a corresponding vector from a time shifted vector are accumulated to a second averaged sum signals. The difference of the real part of said averaged sum-signals represents the time error value. The time shift corresponds to the length of the guard interval.

Accordingly, the present invention provides a robust scheme to rapidly acquire and continuously track the timing of OFDM symbols. In a preferred embodiment, the determined time error value of the time error estimator is used to adjust, especially to advance or retard the fast Fourier-transformation selection window or to increase or decrease a sample conversion rate in a sample rate converter in a case a sample rate converter is used or to increase or decrease a sample rate in an analog-digital converter in a case an analog-digital converter is used.

In other words: The present invention is a new non-data assisted method for time tracking the symbols on the time domain. The symbol time error estimator and the method for estimating the symbol time error is based on the time domain.

Based on a new non-data assisted criterion the invention is concerned with symbol time synchronization for data modulated OFDM signals that use a cyclic prefix (or suffix) to protect the symbols from intersymbol interference. Since mostly all OFDM systems make use of this scheme, and the criterion is non-data assisted, the invention is applicable to a wide range of ODFM based systems. The invention works for OFDM with arbitrary FFT lengths (large FFT sizes yield less noisy estimates) and most practical guard intervals (at least from 1/32 to 1/2).

The invention makes use of a novel criterion that yields as an absolute value a value proportional to the occurring intersymbol interference and as its sign the direction in which to adjust the timing. This way, the receiver can adjust its timing such that the intersymbol interference of the received symbols is reduced to its minimum. The error estimate itself is unbiased.

The invention delivers an error signal for the symbol timing that can be used in a conventional tracking loop to adjust the time window to select the optimum sample vectors for the demodulator. The performance of the invention combined with the conventional tracking loop is expected to be equivalent, if not exceed the performance of the IFFT based channel impulse response estimation method. The criterion yields good results in single path and multipath environments including SFN, even if the delay between paths exceeds the guard interval duration. It also yields good results when the impulse response is spread out over a long duration inside the guard interval.

The error signal is derived from the input signal of the FFT and takes into account the FFT input of either the preceding, actual or succeeding symbol. Thus, the invention is solely pre-FFT based.

The computational complexity and memory requirements are comparable to the simple slope estimation method. An additional IFFT as most commonly used today is not needed.

The invented time tracking algorithm maps well on standard digital signal processors.

Different implementation variants exist such that the tracking loop can be adapted to the implementation and performance needs of the application.

Furthermore, it is possible to combine those implementation variants to even increase the performance.

If parameters are chosen correctly, the tracking range of the invented tracking loop is half the FFT size samples (equivalent to a duration Tu/2) to the left or right of the guard interval. In the range of a quarter FFT size samples (equivalent to duration of Tu/4), the mean error signal derived by the time error estimator is almost proportional to the actual time error, making the time estimator ideal for conventional tracking loop implementations. The time shift corresponds to the length of the guard interval.

Depending on the equalizer implementation (not subject of this invention), a compensation of the mean slope of the channel transfer function may be needed.

Compensation of the slope can be done by multiplication in the frequency domain with a vector that has a linearly increasing or decreasing phase, or by cyclically shifting the input vector of the FFT. With an inclusion of a correction factor, the invention can cope with FFT outputs for which the FFT input has been cyclically shifted. Thus, the invention also fits well into receiver structures that make use of the cyclic FFT input vector shift technique.

The described time domain symbol time error estimator based on the determining of a time error value based on the intersymbol interference of selected samples of different parts of a symbol by cyclically shifting the input vector of the FFT allows less computation than the frequency domain symbol time error estimator. In contrast the higher memory requirements of the time domain symbol time error estimator is negligible. Furthermore, the frequency domain symbol time error estimator makes use of the filtering properties of the FFT and is less susceptible to adjacent channel interference than the time domain symbol time error estimator, if the receiver relies on the FFT to reduce residual adjacent channel interference. Both symbol time error estimators, the frequency domain symbol time error estimator described in the patent application (amtliches Aktenzeichen von Invention Disclosure #298172 einfügen) which is filed before and implement to this patent application and the time domain symbol time error estimator described herein, have the same mathematical background, and both possess desirable properties.

Figure 5:
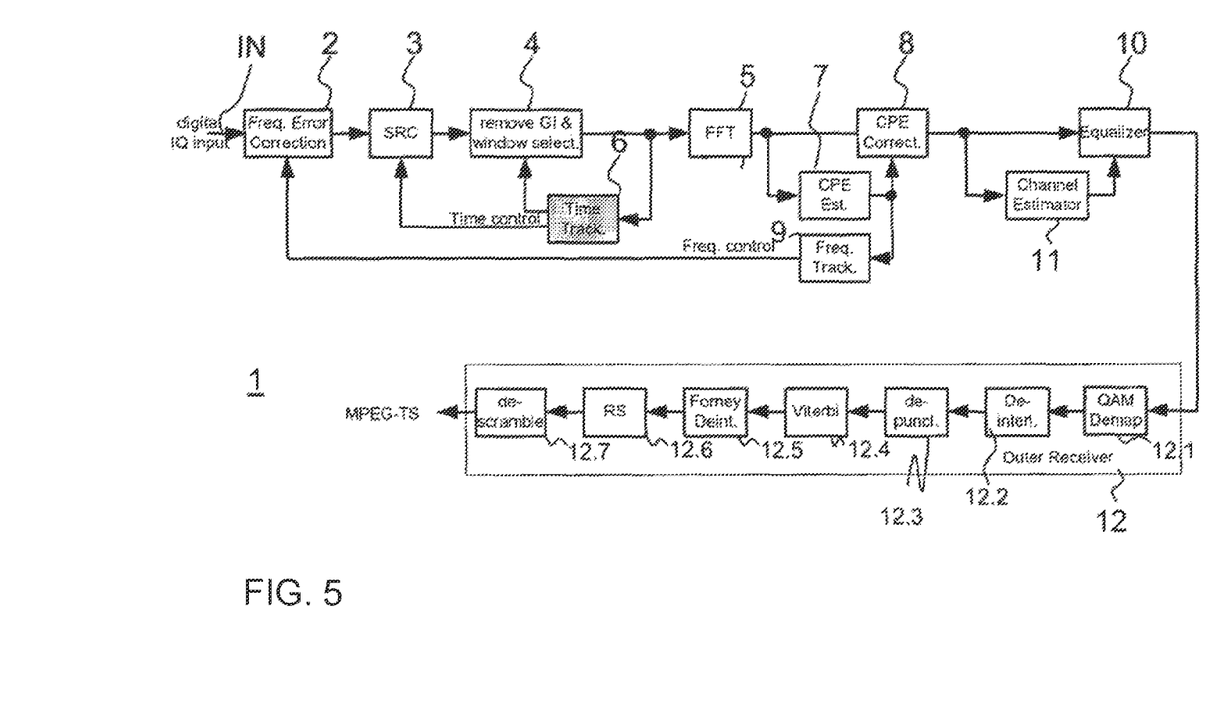
FIG. 5 shows a block diagram of a preferred embodiment of a receiver for a broadband transmission system, FIG. 6 show a block diagram of a preferred embodiment of a symbol time error estimator of a receiver.
Figure 6:
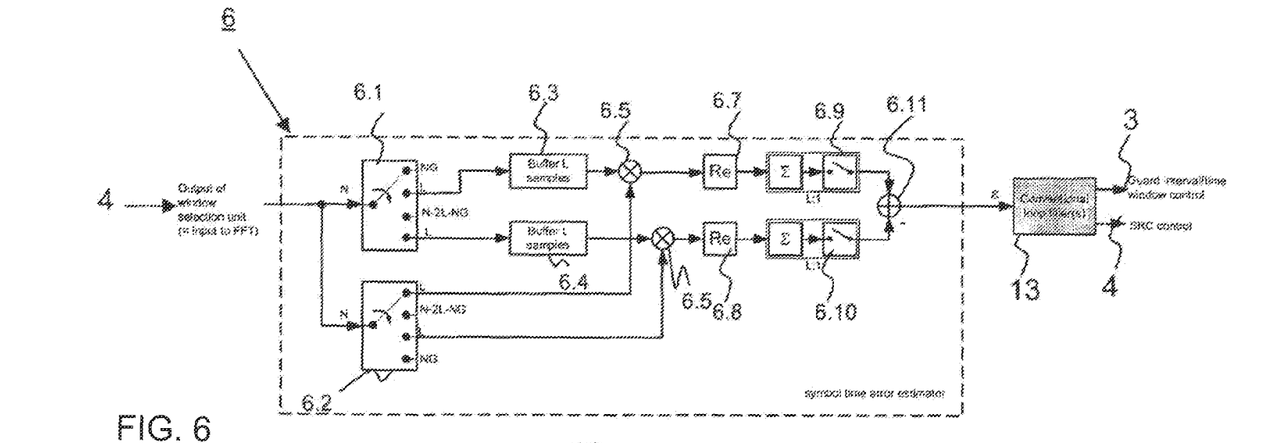
Figure 7:
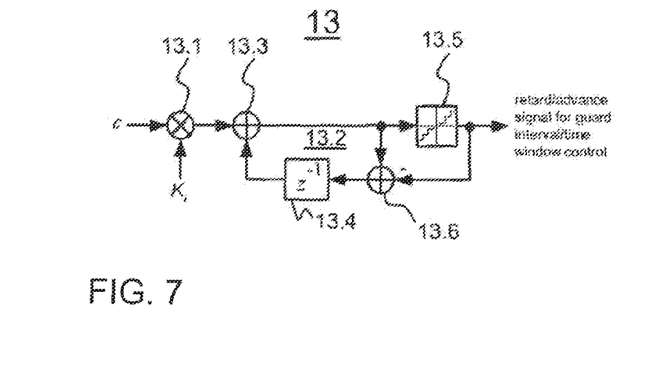
FIG. 7 shows a block diagram of an embodiment of a suitable loop filter for time tracking DLL.
Figure 8:
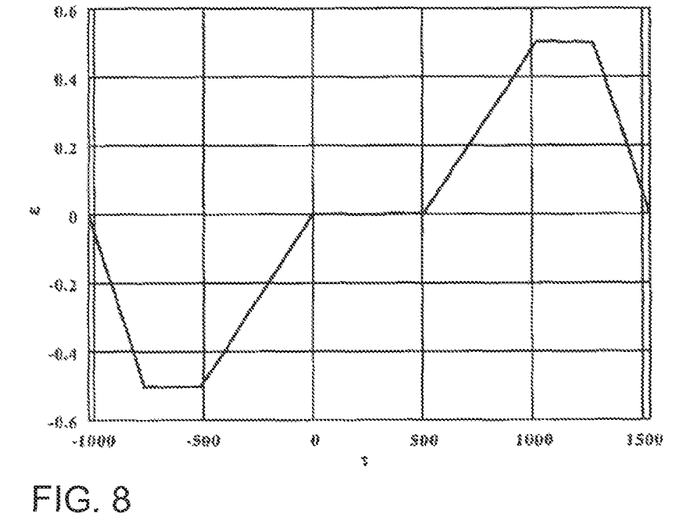
FIG. 8 shows a diagram with an example for an S-curve for single path with a guard interval ¼, FFT size 2048, SNR 10 dB.
Figure 9:
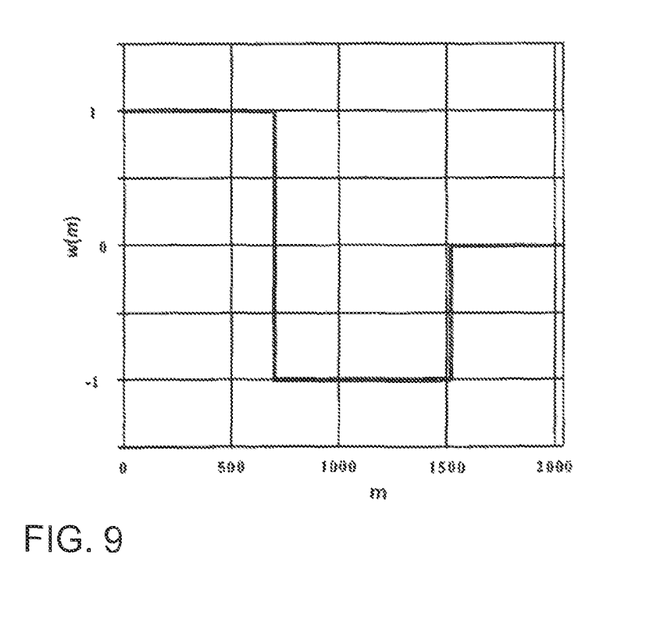
FIG. 9 shows a diagram with an example for the weighting function of the S-curve according to FIG. 7.
Figure 10:
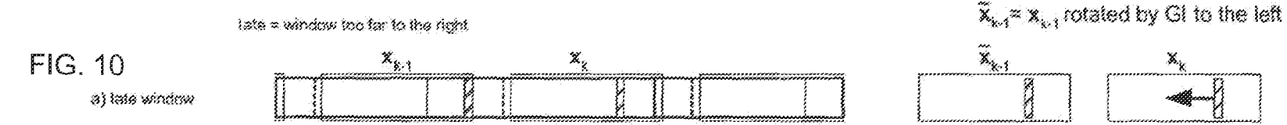
FIG. 10A to 10D shows different locations of an FFT window with respect to the useful data samples of received symbols and the correlation between two successive vectors in case of intersymbol interference.
Figure 11:
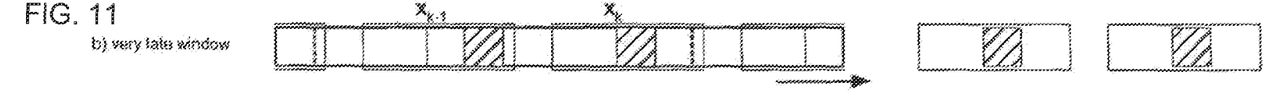
Figure 12:
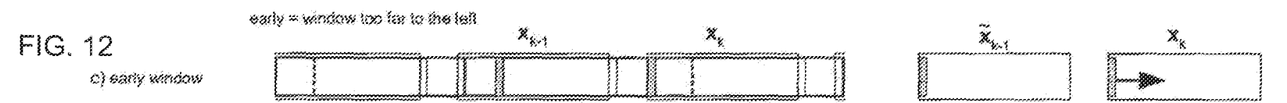
Figure 13:
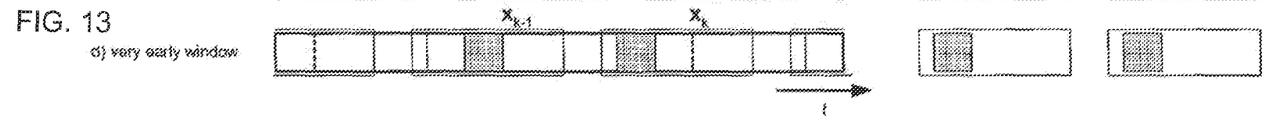

FIG. 5 shows a block diagram of a preferred embodiment of a receiver for a broadband transmission system, FIG. 6 show a block diagram of a preferred embodiment of a symbol time error estimator of a receiver, FIG. 7 shows a block diagram of an embodiment of a suitable loop filter for time tracking DLL, FIG. 8 shows a diagram with an example for an S-curve for single path with a guard interval ¼, FFT size 2048, SNR 10 dB, FIG. 9 shows a diagram with an example for the weighting function of the S-curve according to FIG. 7, FIGS. 10 to 13 shows different locations of an FFT window with respect to the useful data samples of received symbols and the correlation between two successive vectors in case of intersymbol interference.

For a detailed description on how to use the invention, at first, a typical DVB-T/H receiver is considered.

FIG. 5 shows a block diagram of a typical DVB-T/H receiver 1. For simplicity, the circuitry for post-FTT based acquisition is not shown. The digital IQ input IN that is provided by the analog-front-end, an analog-to-digital-converter (ADC), and additional digital filter circuitry, is further frequency error corrected often by controlling a digital frequency shifter in a frequency error correction unit 2.

The corrected signal is then fed through a sample-rate-converter 3 (SRC) that can correct for sampling frequency offset between the transmitter and the receiver ADC(s). The sample-rate-converter 3 may optionally include additional decimation and low-pass filtering.

After correction of frequency and sample frequency clock offsets, for each received symbol, a unit 4 for window selection and removing the guard interval Tg is used. In more detail, a vector of FFT size samples is selected. On this vector, the FFT is performed in an FFT unit 5.

Depending on the receiver implementation, residual common phase error (CPE) needs to be removed. Typically, the continuous pilots are extracted from the multiplex and are used for estimating the common phase error in a unit 7 from which an adequate estimate is obtained. This estimate is then used to correct the common phase error at the output of the FFT unit 5 in a CPE correction unit 8.

The estimate common phase error can further be used for tracking any residual frequency offset in a frequency tracking circuit 9 to control the frequency error correction block 2.

For successive processing, the impairments added by the channel must be removed from the CPE corrected symbol by means of an equalizer 10. An estimate of the channel transfer function (CTF) is obtained from a channel estimator 11 by using typically the scattered pilots extracted from the multiplex. Typically, the channel estimate is obtained by means of interpolating the channel from the scattered pilots based estimates in time- and frequency domain.

The corrected OFDM symbol and the estimated channel transfer function are then transferred to the outer receiver 12. The outer receiver 12 then performs symbol demapping, symbol and bit deinterleaving, depuncturing, convolutional decoding typically by the means of a Viterbi processor, outer (Forney) deinterleaving, Reed-Solomon decoding, and finally derandomizing (descrambling) to deliver an MPEG transport stream (MPEG-TS). Therefore, the outer receiver 12 comprises a plurality of conventional functional blocks or units 12.1 to 12.7.

The proposed time tracking algorithm as described in this invention disclosure uses the input of the FFT unit 5 or the output of the unit 4 for window selection and removing the guard interval Tg, as shown in FIG. 4, which connects with a symbol time error estimator 6 for symbol time control the window selection unit 4 or the sample-rate-converter 3. This is in contrast to other known techniques that use the scattered pilots or an estimate of the channel transfer function CTF.

FIG. 6 shows the block diagram of a possible implementation of the proposed time tracking algorithm, where the invented symbol time error estimator 6 is emphasized. The symbol time error estimator 6 takes the input samples of the FFT unit 5 of a received symbol.

For time error estimation, only the input samples of the FFT that contain carriers are useful.

In Detail, two units 6.1 and 6.2 which select a number of samples of different parts of said received symbol are provided. E.g. samples of the end of the previous symbol and samples of the middle part of the symbol are selected. In order to reduce computational complexity, it is also possible to only select a subset of those carriers. Selecting only a subset of carriers, however, comes at the expense of a noisier error estimate and requires a smaller loop filter bandwidth for similar time jitter. Whether this can be tolerated depends on the required tracking convergence time. The set of carriers or subset should be in sequential order.

The two units 6.1 and 6.2 are demultiplexer. The first demultiplexer 6.1 selects a vector of a received symbol of size N into four parts: The first part consisting of the first NG samples of a received symbol of the FFT input signal, where NG corresponds to the size of the guard interval, is discarded. The second part consisting of samples is passed to a first buffer 6.3 that buffers the L samples. The third part of size N-2L-NG is also discarded. Finally, the last part of length L is passed to a second buffer 6.4.

The second demultiplexer 6.2 selects the same input vector of size N into four different parts: The first part consisting of the first L samples is passed to a first multiplier 6.5 that multiplies those samples L with the complex-conjugated buffered samples L from the first buffer 6.3 out of which products a first sum over the real part 6.7 of the results is calculated in a first unit 6.9 for sum-calculation. The second part of the input vector of N-2L-NG samples is discarded. The third part consisting of the next L samples is passed to a second multiplier 6.6 that multiplies those samples L with the complex-conjugated buffered samples L of the second buffer 6.4 out of which products a second sum over the real part 6.8 of the results is calculated in a second unit 6.10 for sum-calculation. The sum-calculation in the units 6.9 and 6.10 are often referred to as "integrate and dump". Finally, the last part of length NG is discarded.

The difference between the first sum and second sum is calculated to form an error signal ϵ in a unit 6.11 for difference-calculation. The error signal ϵ is passed to a conventional loop filter 13 that has low pass characteristics and which output controls the window selection unit 4. An additional loop filter can filter this output to control the sample rate converter 3.

In more detail, the correlation value of the error signal ϵ between vectors x and y of the digital FFT input signal is calculated by summing the products of their elements x(m) and y(m), for $0 \leq m \leq N-1$, where N is the length of the vectors (for OFDM the length of the FFT):

$$R_{xy}(0) = \sum_{m=0}^{N-1} x(m)y^*(m).$$

Since the cyclic prefix is an identical copy of the last samples, if correlation is observed, it will only be observed on the real part Rx, Ry of the vectors x and y.

For symbol time tracking, occurring of intersymbol interference (ISI) is determined. Additionally to the occurring of intersymbol interference an early or late misalignment of the FFT window is determined.

In order to separate intersymbol interference originating from an early misalignment from intersymbol interference originating from late misalignment of the FFT window, the correlation function is split into two partial correlations.

The intersymbol interference due to an early window misalignment can be estimated as follows:

$$R_e = \text{Re}\left\{\sum_{m=N-N_G-L}^{N-N_G-1} x_k(m)\tilde{x}_{k-1}^*(m)\right\}w^j.$$

The intersymbol interference due to a late window misalignment can be estimated as follows:

$$R_1 = \text{Re}\left\{\sum_{m=0}^{L-1} x_k(m)\tilde{x}_{k-1}^*(m)\right\}w^j,$$

where L is a constant that defines the tracking range, e=earlier time error estimation, l=late time error estimation. With those two measures, the symbol time error estimator 6 can be defined in a way similar to a symbol time error signal $\epsilon$ by calculation the difference between the real part of the early time error estimation and the late time error estimation, where the error criterion $\epsilon$ is simply:

$$\epsilon = R_e - R_l.$$

For closing the tracking loop, the symbol time error value $\epsilon$ is fed into a loop filter 13 that performs additional averaging to reduce noise of the symbol time error value $\epsilon$. The design of a tracking loop is straightforward. A possible embodiment of a loop filter 13 is described in FIG. 7.

In FIG. 7, the symbol time error value $\epsilon$ from the time error estimator 6 is first multiplied with integration constant $K_i$ in a multiplication block 13.1. This constant determines the loop filter bandwidth. The product is accumulated in the successive integration circuit 13.2 with sum blocks 13.3 and a delay block 13.4 and a quantizer 13.5 with a sum block 13.6. In Detail, i.e. the output-signal of the multiplication block 13.1 is added to the sum of all previously accumulated values enabled by the one value delay element denoted as $z^{-1}$. The accumulated value is also given to the quantizer 13.5 that contains the zero value. If the sum exceeds one or more integer numbers, the integer number is given out as a retard/advance signal to the guard interval/time window control block 4 to advance or retard by an integer number of samples on the incoming sample stream in the sample rate converter 3. At the same time, the integer value is subtracted from the accumulated value in the loop filter 13.

In a similar fashion, typically using a second or higher order loop filter, the time drift can be estimated. The time drift estimate can then be used to adjust the sample rate conversion factor at the sample rate converter 3.

In the remainder of this section, the performance of the time error estimator 6 is illustrated.

FIG. 8 shows a possible S-curve obtained from simulations over one hundred consecutive OFDM symbols, where the channel is a single path channel. The FFT size is 2048 samples, and the guard interval is ¼. In this example, a constant L is defines the tracking range as follows: $L=(N-N_G)/2$. White Gaussian noise has been added with an SNR of 10 dB. The S-curve shows the averaged result over all one hundred symbols. The S-curve has been obtained by simulating the symbol time error value $\epsilon$, for time offsets, $\tau$, where $\tau$ is defined in samples, and here $\tau=0$ means the FFT is calculated on the first samples of an OFDM symbol, i.e. the cyclic prefix is fully included in the input vector to the FFT. The S-curve shows that for offsets of $\tau$ from 0 to 511, the symbol time error value $\epsilon$ is essentially zero. For the single path channel, for this ranges no intersymbol interference occurs, and therefore, for this range there is no need for adjusting the FFT window.

For $\tau$ negative, the receiver 1 experiences intersymbol interference from the previous symbol. The symbol time error value $\epsilon$ becomes negative telling the tracking circuitry to retard on the received sample stream. For $\tau$ exceeding the guard interval duration, the receiver 1 experiences intersymbol interference from the succeeding symbol. In this case, the symbol time error value $\epsilon$ becomes positive telling the tracking circuitry to advance on the received sample stream.

Instead of splitting the correlation function into different parts, a mathematical identical way to describe the time error value $\epsilon$ is $$\varepsilon = \text{Re}\left\{\sum_{m=0}^{N-1} w(m)x_k(m)\tilde{x}_{k-1}^*(m)\right\},$$

where w(m) is a weighting function that is positive for $0 \leq m < L$, negative for $N-N_G-L \leq m < N-N_G$ and zero elsewhere. For $L=(N-N_G)/2$ as used to produce the S-curve in FIG. 8. A possible graph of the weighting function w(m) shows FIG. 9.

The circular shifted vectors $\tilde{x}_k(m)$ can be mathematically expressed by a circular convolution as follows:

$$\tilde{x}_k(m) = x_k(m) \otimes \delta(m+N_G),$$

where $$\delta(m) = \begin{cases} 1 & m=0 \\ 0 & m \neq 0, \end{cases}$$

Therefore, the time error value $\epsilon$ can be expressed as:

$$\varepsilon = \text{Re}\left\{\sum_{m=0}^{N-1} w(m)x_k(m)x_{k-1}^*(m) \otimes \delta(m+N_G)\right\}.$$

Making use of the so called Parseval's theorem:

$$\sum_{m=0}^{N-1} w(m)y^*(m) = \frac{1}{N}\sum_{m=0}^{N-1} X(m)Y^*(m),$$

where X(m) and Y(m) are the Fourier representation of x(m) and y(m), respectively. a frequency domain representation for the time error value $\epsilon$ can be obtained:

$$\varepsilon = \frac{1}{N}\text{Re}\left\{\sum_{m=0}^{N-1} W(m) \otimes X_k(m)X_{k-1}^*(m)e^{j2\pi\frac{mN_G}{N}}\right\}.$$

Since w(m) is of relatively low bandwidth, most of the energy in W(m) is located around the zero carrier, and since w(m) has zero mean, $W(0)=0$. Therefore, the time error value $\epsilon$ can be approximated to be as follows:

$$\varepsilon \approx \frac{1}{N} \text{Re} \left\{ \sum_{n=-1,1} W(n) \sum_{m=0}^{N-1} X_k(m-n) X_{k-1}^*(m) e^{j2\pi \frac{mN_G}{N}} \right\}$$

that leads to the method and apparatus described in the filed application EP 05112274.5.

FIGS. 10A to 10D show different locations of a FFT window with respect to the useful data samples of received symbols and the correlation between two successive vectors in case of intersymbol interference.

The above described invention allows to measure the intersymbol interference by obtaining an unbiased estimate of the described time error value $\epsilon$. The sign of the estimate time error value $\epsilon$ indicates in which direction the FFT window needs to be adjusted.

FIG. 10A to 10D show different locations of an FFT window with respect to received symbols and selected samples. In FIG. 10A the FFT window is a little late meaning that a few samples of the next symbol are included in each symbol. An extreme late misalignment of the FFT window is shown in FIG. 10B. Noting that the cyclic prefix is an identical copy of the last samples of an OFDM symbol, it can be seen that in case of a late FFT window selection, identical samples are included in two consecutive windows, i.e., the sample vector $x_k$ for the k-th window contains some samples that are identical to some samples contained in vector $x_{k-1}$. In case of late misalignment of the FFT windows, vectors $x_k$ and $x_{k-1}$ contain samples that are correlated. By cyclically rotating the elements in $x_{k-1}$ by a number of samples that contains to the length of the guard interval to the left, correlated samples are in the same location, i.e. in the right part of the vectors $x_k$ and the cyclically rotated vector $x_{k-1}$ starting from the end of the vector minus the length of the guard interval towards the beginning of the vector. The number of correlated samples increases with the misalignment of the FFT window up to the length of the guard interval. Afterwards, the block of correlated samples in $x_k$ and the cyclically rotated vector $x_{k-1}$ start shifting to the left.

In FIG. 10C the FFT window is a little too early meaning that a few samples of the previous symbol are included in each symbol. An extreme early misalignment of the FFT window is shown in FIG. 10D. It can be seen that in these cases, correlated samples are found in the left parts of $x_k$ and the cyclically rotated vector $x_{k-1}$.

As discussed above, albeit proposed for the context of DVB-T/H, the invention is not limited to DVB-T/H only, but applicable to a wide range of OFDM systems including DAB, ISDB-T, DMB-T, and possibly others e.g. in ADSL/VDSL or to the upcoming WiBro and WiMax standards.

LIST OF NUMERALS

| | |
|---|---|
| 1 | receiver |
| 2 | frequency error correction unit |
| 3 | sample rate converter |
| 4 | window selection and guard interval removing unit |
| 5 | FFT unit |
| 6 | symbol time error estimator |
| 6.1 | sample selection block |
| 6.2 | sample selection block |
| 6.3 | buffer block |
| 6.4 | buffer block |
| 6.5 | constant multiplication block |
| 6.6 | constant multiplication block |
| 6.7 | real part |
| 6.8 | real part |
| 6.9 | sum block |
| 6.10 | sum block |
| 6.11 | difference block |
| 7 | common phase error estimator |
| 8 | common phase error correction unit |
| 9 | frequency tracking unit |
| 10 | equalizer |
| 11 | channel estimator |
| 12 | outer receiver |
| 12.1 to 12.7 | functional blocks of the outer receiver |
| 13 | loop filter |
| 13.1 | multiplication block |
| 13.2 | successive integration block |
| 13.3 | sum block |
| 13.4 | delay block |
| 13.5 | quantizer |
| 13.6 | sum block |

The invention claimed is:

1. A method for estimating a symbol time error in a broadband transmission system, comprising:
   determining a timing error signal of an input-signal of a discrete Fourier-transformation block in a data symbol stream on the basis of intersymbol correlation using a predetermined period in each received symbol;
   selecting as the predetermined period a number of samples of different useful data parts of a symbol;
   determining a time error value ($\epsilon$) based on the intersymbol correlation of the selected samples of the different useful data parts of the symbol;
   wherein before performing the discrete Fourier-transformation of the selected number of samples:
   buffering a first vector of samples of the end of a preceding symbol;
   buffering a second vector of samples of the middle part of the preceding symbol;
   multiplying, using element-wise complex-conjugate multiplication, the first vector with a corresponding vector from a time shifted vector of an actual symbol;
   multiplying, using element-wise complex conjugate multiplication, the second vector with a corresponding vector from a time shifted vector of the actual symbol;
   calculating a first averaged sum-signal of the element-wise complex-conjugate multiplied first vector;
   calculating a second averaged sum-signal of the element-wise complex-conjugate multiplied second vector; and
   calculating the time error value based on difference between the real part of the first averaged sum-signal and the real part of the second averaged sum-signal.

2. The method of claim 1, further comprising:
   using a preceding symbol, a succeeding symbol or an actual symbol for selecting the number of samples.

3. The method according to claim 1, wherein the determination of the time error value ($\epsilon$) comprises:
   copying the selected samples as a cyclic extension preceding or succeeding in an interval of an output-signal for each symbol at a transmitter after an inverse Fourier-transformation for the cyclic extension.

4. The method according to claim 1, wherein, a number of the selected samples on which the discrete Fourier-transformation is performed equals a length of the discrete Fourier-transformation.

5. The method according to claim 1, further comprising, determining a number of individual time error values ($\epsilon$) by using different sample shift factors.

6. The method according to claim 5, further comprising, determining a combined time error value by adding the individual time error values ($\epsilon$).

7. The method according to claim 1, further comprising, using the determined time error value ($\epsilon$) to adjust timing.

8. The method according to claim 1, further comprising, using the determined time error value ($\epsilon$) to adjust, especially to advance or retard a fast Fourier-transformation selection window.

9. The method according to claim 1, further comprising, using the determined time error value ($\epsilon$) to increase or decrease a sample conversion rate in a sample rate converter.

10. The method according to claim 1, further comprising, using the determined time error value ($\epsilon$) to increase or decrease a sample conversion rate in an analog-digital converter.

11. A system for estimating a symbol time error in a broadband transmission system, which receives a data symbol stream from a transmitter, comprising:
a symbol time error estimator for determining a timing error signal of a digital input-signal of a discrete Fourier-transformation block in the data symbol stream on the basis of intersymbol correlation using a predetermined period in each received symbol, wherein a number of samples of different useful data parts of a symbol are selected as the predetermined period and a time error value ($\epsilon$) is determined based on the intersymbol correlation of the selected samples of the different parts of the symbol;
two units for multiplying element-wise complex-conjugate multiplication, the selected samples of a relevant symbol with buffered samples of the relevant symbol part wise;
two units for calculating a first and second averaged sum-signal of the element-wise complex-conjugate multiplied samples part wise; and
a unit for calculating a difference between the real part of the first averaged sum-signal and the real part of the second averaged sum-signal to map the time error value ($\epsilon$) to a real or imaginary axis.

12. The system according to claim 11, further comprising:
two units for selecting a number of samples of the same different useful data parts of a symbol of the digital input signal of the discrete Fourier-transformation block.

13. The system according to claim 11, further comprising:
a buffer for storing the selected samples of the different useful data parts of the symbol.

14. The system according to claim 11, wherein, the time error value ($\epsilon$) of the time symbol error estimator is used to adjust timing.

15. The system according to claim 11, wherein, the time error value ($\epsilon$) of the symbol time error estimator is used to adjust especially to advance or retard a fast Fourier-transformation selection window.

16. The system according to claim 11, wherein, the time error value ($\epsilon$) of the symbol time error estimator is used to increase or decrease a sample conversion rate in a sample rate converter.

17. The system according to claim 11, comprising:
wherein,
the time error value ($\epsilon$) of the symbol time error estimator is used to increase or decrease a sample rate in an analog-digital converter.

18. The system according to claim 11, wherein, the time error value ($\epsilon$) is averaged by means of an FIR or IIR loop filter and an output of the loop filter is used to adjust timing.

* * * * *